United States Patent [19]
Rancourt et al.

[11] Patent Number: 5,520,960
[45] Date of Patent: May 28, 1996

[54] ELECTRICALLY CONDUCTIVE POLYIMIDES CONTAINING SILVER TRIFLUOROACETYLACETONATE

[75] Inventors: James D. Rancourt, Blacksburg; Diane M. Stoakley, Poquoson, both of Va.; Maggie L. Caplan, Sun City West, Ariz.; Anne K. St. Clair, Poquoson; Larry T. Taylor, Blacksburg, both of Va.

[73] Assignee: The United States of America as represented by the Administrator of the National Aeronautics and Space Administration, Washington, D.C.

[21] Appl. No.: 286,032

[22] Filed: Aug. 3, 1994

[51] Int. Cl.$^6$ ................................ B05D 3/02; B05D 5/12
[52] U.S. Cl. ................ 427/385.5; 427/58; 427/126.1
[58] Field of Search ........................... 427/385.5, 419.8, 427/58, 126.1

[56] References Cited

U.S. PATENT DOCUMENTS

| | | |
|---|---|---|
| 3,356,527 | 12/1967 | Moshier et al. . |
| 3,474,464 | 10/1969 | Matthews et al. ................ 427/253 |
| 3,966,595 | 6/1976 | Gosser ................ 260/429 R |
| 4,387,115 | 6/1983 | Kitamura et al. ................ 427/96 |
| 4,543,295 | 9/1985 | St. Clair et al. ................ 427/385.5 |
| 5,230,965 | 7/1993 | Cole, Jr. et al. ................ 428/610 |
| 5,395,642 | 3/1995 | Hamerich et al. ................ 427/8 |

*Primary Examiner*—Diana Dudash
*Attorney, Agent, or Firm*—George F. Helfrich

[57] ABSTRACT

Polyimides with enhanced electrical conductivity are produced by adding a silver ion-containing additive to the polyamic acid resin formed by the condensation of an aromatic dianhydride with an aromatic diamine. After thermal treatment the resulting polyimides had surface conductivities in the range of $1.7 \times 10^{-3}$ 4.5 $\Omega^{-1}$ making them useful in low the electronics industry as flexible, electrically conductive polymeric films and coatings.

14 Claims, No Drawings

ELECTRICALLY CONDUCTIVE POLYIMIDES CONTAINING SILVER TRIFLUOROACETYLACETONATE

ORIGIN OF THE INVENTION

The invention described herein was jointly made by an employee of the United States Government and contract employees during the performance of work under NASA Contract NAS1-19000 and is subject to the provisions of Section 305 of the National Aeronautics and Space Act of 1958, as amended Public Law 85-568 (72 Stat. 435; 42 USC 2457), and during the performance of work under NASA Grant NAG-1-343. In accordance with 35 USC 202, the grantee elected not to retain title.

BACKGROUND OF THE INVENTION

1. Field of the Invention

This invention relates generally to conductive polymers. It relates particularly to aromatic condensation polyimide films and coatings which have surface conductivities in the range of $1.7 \times 10^{-3}$ to $4.5 \, \Omega^{-1}$, and to the process for their preparation.

2. Description of the Related Art

The incorporation of metal salts and complexes has been used as a means of providing polyimides with increased bulk conductivities and/or greatly enhanced surface conductivities. Additives of numerous metals including platinum, palladium, copper, cobalt, gold and silver have been investigated. (L. T. Taylor, et al, U.S. Pat. No. 4,311,615(1982) and L. T. Taylor, V. C. Carver, T. A. Furtsch, "Incorporation of Metal Ions into Polyimides," *ACS Symposium Series. No. 121 Modification of Polymers*, C. E. Carraher, Jr., and M. Tsuda, Eds., pp 71–82, 1980.)

Polyimides with metallized silver surfaces have been reported with the addition of silver acetate and silver nitrate to the polyamic acid resin (A. L. Endrey and E. I. DuPont De Nemours and Co., U.S. Pat. No. 3,073,784 (1963) and A. Auerbach, *J. Electrochem. Soc.*, p. 937, April 1984.). Conductive surfaces were achieved after extended cure times or a high temperature (360° C.–370° C.) bake under a blanket of carbon powder. In addition to the incorporation of silver acetate or nitrate into polyamic acid resins as an approach to achieving conductive polyimides, counter-current diffusion has also been successfully used to provide polyimide films with conductive and reflective metallic interlayers (L. E. Manring, *Polymer Communications*, 28, 68, March 1987.) Conductive polymer films have also been reported by infusion deposition of silver and compounds into films of polyphenylquinoxaline and several other high temperature polymers although polyimides were not among them (R. Liepins et al, U.S. Pat. No. 4,876,032(1989.)

A primary object of the present invention is to provide aromatic condensation polyimide films and coatings that have surface conductivities in the range of $1.7 \times 10^{-3} - 4.5 \Omega^{-1}$.

Another object of the present invention is to provide a process for increasing the conductivity of an aromatic condensation polyimide to a range useful for the electronics industry.

SUMMARY OF THE INVENTION

The foregoing and additional objects and benefits are obtained by providing a surface conductive linear aromatic polyimide which is obtained from the thermal imidization of a polyamic acid resin containing silver trifluoroacetylacetonate.

By the present invention, aromatic condensation polyimide films and coatings are produced which have surface conductivities that have been increased by the incorporation of silver trifluoroacetylacetonate. Provided are materials that are electrically conducting in the range that is useful for films and coatings for the electronics industry, where the combination of conductivity, mechanical strength and thermal stability are required.

The novel conducting polyimide compositions of the present invention are a significant Improvement over the prior art. Conducting films according to the present invention are achieved by using a lower cure temperature. In addition, the method of the present invention eliminates altogether the need for a cumbersome blanket of carbon powder used in prior art methods to effect conductivity. The method of the present invention is also superior to the prior art method of counter-current diffusion, because of the handicaps of the latter process which Include (1) a lack of reproducibility in conductivity, (2) high cost, and (3) inability to produce large-scale quantities of material.

DESCRIPTION OF THE PREFERRED EMBODIMENTS

Preparation of polyimide films and coatings according to the present invention involves the room temperature reaction in a solvent of an aromatic diamine with an aromatic dianhydride to yield a polyamic acid. This polymer resin is then cast as a film and thermally cured, preferably at 250°–300° C. to give a polyimide film. Examples of suitable solvents are N,N-dimethylacetamide, N-N-dimethylformamide, N-methyl-2-pyrrolidone, dimethylsulfoxide, and bis(2-methoxyethyl)ether.

The polyamic acids of this invention involve the addition of an equimolar quantity of an aromatic dianhydride such as 3,3',4,4'-benzophenone tetracarboxylic dianhydride (BTDA) or pyromellitic dianhydride (PMDA) to a stirred solution of an aromatic diamine such as 4,4'-oxydianiline (4,4'-ODA) or 2,2[4-(4-aminophenoxy)phenyl] hexafluoropropane (4-BDAF) in an amide-type solvent. Although BTDA and PMDA were used for the specific examples, other dianhydrides can be employed such as 4,4'-oxydiphthalic anhydride (ODPA), 4,4'-bis(3,4dicarboxyphenoxy) diphenylsulfide dianhydride (BDSDA), 2,2'-bis(3,4-dicarboxyphenoxy)hexafluoropropane dianhydride (6FDA), 1,4-bis(3,4-dicarboxyphenoxy) benzene dianhydride, and 3,4,3',4'-biphenyl tetracarboxylic dianhydride. The diamines that were used in the specific examples were 4,4'-ODA and 4-BDAF; however other diamines also useful in the present invention include any isomer of oxydianiline, diaminobenzophenone, diaminodiphenylmethane, phenylenediamine, diaminodiphenylsulfone and bis(aminophenoxy)phenyl hexafluoropropane.

In addition to polyamic acid resins obtained by reacting equimolar amounts of aromatic diamine and dianhydride, endcapped polyamic acid resins are also useful in the present invention. They are obtained by adding an excess of BTDA, phthalic anhydride (PA) or other anhydride or dianhydride to the polyamic acid resin.

According to the present invention, the incorporation of silver trifluoracetylacetonate into the polyamic acid resin was found to provide a means of increasing the surface conductivity of the thermally cured aromatic condensation polyimide. This silver complex can be added immediately following the dianhydride, or after the polyamic acid polymerization is complete. The solubility of the additive in the resin is enhanced by the addition of a small amount of solvent to the silver trifluroacetylacetonate before its addition to the polyamic acid resin.

Although, the most successful combination of film flexibility and conductivity has been obtained using a 1:1,1:1.74 or a 1:2 mole ratio of silver trifluoroacetylacetonate to polyimide repeat unit, higher and lower concentrations may be used with differing heating schedules to achieve highly satisfactory silver metallized films.

SPECIFIC EXAMPLES

Example 1

3,3',4,4'-Benzophenone tetracarboxylic dianhydride (BTDA)/4,4'-oxydianiline (4,4'-ODA) resin endcapped with 2% BTDA was prepared by reacting 4.005 g (0.0200 moles) 4,4'-ODA with 6.572 g (0.0204 moles) BTDA in 56.2 g N,N-dimethylacetamide (DMAc). To 4.5424 g of this resin was added 0.2194 g (0.782 mmoles) silver trifluoroacetylacetonate (Agtfa) in 2.0 ml of DMAc. After stirring for 1 ½ hours a film was cast onto a soda-lime glass plate to a wet thickness of 0.019". The silver ion-containing polyamic acid film was thermally converted to the corresponding surface conducting polyimide by successive one hour heatings in a forced air oven at 100°, 200° and 300° C. The resulting flexible, reflective film had surface conductivity by four point probe.

Example 2

BTDA/4,4'-ODA resin endcapped with 2% phthalic anhydride (PA) was prepared by reacting 4.005 g (0.0200 moles) 4,4'-ODA with 6.381 g (0.0200 moles) BTDA and 0.0593(0.0004 moles) PA in 42.2 g DMAc. To 34.522 g of this resin was added 1.9546 g (0.0200 moles) BTDA and 0.0593 g Agtfa in 30 ml (28.1 g) DMAc. After stirring for 2 hours a film was cast 0.019" thick on a glass plate. The silver ion-containing polyamic acid film was thermally converted to the corresponding surface conducting polyimide by heating in a preheated forced air oven for 20 min at 80° C., 1 hour at 100°, 1 hour at 200° and 2 hours at 300° C. The resulting flexible, reflective film had a conductivity of 1.5 $\Omega^{-1}$ by four point probe.

Example 3

BTDA/4,4'-ODA resin was prepared by reacting 10.012 g (0.050 moles) 4,4'-ODA with 16.081 g (0.050 moles) BTDA in 149.9 g DMAc. To 5.039 g of this resin was added 0.215 g Agtfa in 1.182 g DMAc. After stirring for approximately 2 hours a film was cast 0.018" thick on a glass plate. The silver ion-containing polyamic acid film was thermally converted to the corresponding surface conducting polyimide by heating for 1 hour at 100°, 1 hour at 200° and 4 hours at 300° C. The resulting flexible, reflective film had an average conductivity of $<4.53\Omega^{-1}$ by four point probe.

Example 4

PMDA/4,4'-ODA resin was prepared by reacting 16.019 g (0.080 moles) of 4,4'-ODA with 17.450 g (0.080 moles) of PMDA In 189.7 g DMAc. To 10.004 g of this resin was added 0.521 g Agtfa in 1.996 g DMAc. The mixture was stirred vigorously with a metal spatula and cast 0.018" thick on a glass plate. The silver ion-containing polyamic acid film was thermally converted to the corresponding surface conducting polyimide by heating for 1 hour each at 100°, 200°, and 300° C. and postcuring 2 hours at 300° C. The resulting flexible, reflective film had a conductivity of $1.7 \times 10^{-3} - 6.2 \times 10^{-3}$ $\Omega^{-1}$ by four point probe.

Example 5

A 15% solids solution of BTDA/4-BDAF polyamic acid was prepared by dissolving 25.9445 g (0.05 moles) of 4-BDAF in 238.2 g of DMAc, and then adding 16.1085 g (0.05 moles) BTDA. To 40.0262 g of this polyamic acid resin was added 1.9374 g of Agtfa in 8.0108 g of DMAc. The solution was stirred vigorously with a metal spatula and Immediately cast on plate glass. The silver ion doped polyamic acid resin was converted to the surface-conducting polyimide by curing in a forced air oven 1 hr each at 100° and 200° C. and 3 hr at 300° C. The average conductivity of the air side was 4.5 $\Omega^{-1}$ by four point probe.

What is claimed as new and desired to be secured by Letters Patent of the United States is:

1. A process for producing linear aromatic polyimide films and coatings having surface conductivity comprising:

forming a polyamic acid solution by chemically reacting equimolar quantities of an aromatic diamine and an aromatic dianhydride in a solvent medium;

adding silver trifluoroacetylacetonate in a solvent medium to the polyamic acid solution;

applying a film layer of the polyamic acid solution containing the silver trifluoroacetylacetonate onto a surface; and thermally curing the applied film layer to yield a metallized surface conductive polyimide film.

2. The process of claim 1, wherein endcapping of the polyamic acid is effected before the film layer is applied onto the surface.

3. A process for producing linear aromatic polyimide films and coatings having surface conductivity comprising:

preparing a solution of an aromatic diamine in a solvent medium and adding thereto an equimolar quantity of an aromatic dianhydride followed by silver trifluoroacetylacetonate in a solvent medium to provide a reaction mixture;

chemically reacting the aromatic diamine and the aromatic dianhydride in the reaction mixture to form a solution of a polyamic acid containing silver trifluoroacetylacetonate;

applying a film layer of the solution of the polyamic acid containing silver trifluoroacetylacetonate onto a surface; and thermally curing the applied film layer to yield a metallized surface conductive polyimide film.

4. The process of claim 3, wherein encapping of the polyamic acid is effected before the film layer is applied onto the surface.

5. The process of claim 1, wherein silver trifluoroacetylacetonate is added in an amount sufficient to provide a molar concentration of silver trifluoroacetylacetonate to polyimide repeat unit of from about 1:1 to about 1:2.

6. The process of claim 3, wherein silver trifluoroacetylacetonate is added in an amount sufficient to provide a molar concentration of silver trifluoroacetylacetonate to polyimide repeat unit of from about 1:1 to about 1:2.

7. The process of claim 1, wherein the aromatic diamine is selected from the group consisting of 4,4'-oxydianiline and 2,2-bis[4-(4-aminophenoxy)phenyl]hexafluoropropane.

8. The process of claim 3, wherein the aromatic diamine is selected from the group consisting of 4,4'-oxydianiline and 2,2-bis[4-(4-aminophenoxy) phenyl]hexafluoropropane.

9. The process of claim 1, wherein the aromatic dianhydride is selected from the group consisting of 3,3',4,4'-benzophenone tetracarboxylic dianhydride and pyromellitic dianhydride.

10. The process of claim 3, wherein the aromatic dianhydride is selected from the group consisting of 3,3',4,4'-benzophenone tetracarboxylic dianhydride and pyromellitic dianhydride.

11. The process of claim 2, wherein encapping is effected by means of an encapper selected from the group consisting of 3,3'-4,4'-benzophenone tetracarboxylic dianhydride and phthalic anhydride.

12. The process of claim 4, wherein encapping is effected by means of an encapper selected from the group consisting of 3,3'-4,4'-benzophenone tetracarboxylic dianhydride and phthalic anhydride.

13. The process of claim 1, wherein the solvent medium is selected from the group consisting of:

N, N-dimethylacetamide,

N, N-dimethylformamide,

N,-methyl-2-pyrrolidone, dimethylsulfoxide and bis(2-methoxyethyl) ether.

14. The process of claim 3, wherein the solvent is selected from the group consisting of:

N, N-dimethylacetamide,

N, N-dimethylformamide,

N,-methyl- 2-pyrrolidone, dimethylsulfoxide and bis(2-methoxyethyl) ether.

* * * * *